US011549395B2

(12) United States Patent
Nayak et al.

(10) Patent No.: US 11,549,395 B2
(45) Date of Patent: *Jan. 10, 2023

(54) FOIL-AIR BEARING ASSEMBLY FOR ENGINE STARTER

(71) Applicant: Unison Industries, LLC, Jacksonville, FL (US)

(72) Inventors: Subrata Nayak, Bangalore (IN); David Raju Yamarthi, Bangalore (IN); David Allan Dranschak, Union, OH (US); Shiloh Montegomery Meyers, Miamisburg, OH (US); Pallavi Tripathi, Bangalore (IN); Jasraj Asdev, Bangalore (IN); Sharad Pundlik Patil, Bangalore (IN); Eliel Fresco Rodriguez, Springboro, OH (US)

(73) Assignee: Unison Industries, LLC, Jacksonville, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/462,993

(22) Filed: Aug. 31, 2021

(65) Prior Publication Data
US 2022/0042422 A1 Feb. 10, 2022

Related U.S. Application Data

(63) Continuation of application No. 16/778,278, filed on Jan. 31, 2020, now Pat. No. 11,125,109.

(51) Int. Cl.
F01D 25/16 (2006.01)
F02C 7/06 (2006.01)
F02C 7/277 (2006.01)

(52) U.S. Cl.
CPC ............ F01D 25/16 (2013.01); F02C 7/06 (2013.01); F02C 7/277 (2013.01)

(58) Field of Classification Search
CPC .. F01D 25/16; F02C 7/06; F02C 7/277; F16C 17/042; F16C 17/10; F16C 19/06; F16C 19/163; F16C 32/0622; F16C 21/00; F16C 19/54; F16C 35/02; F16C 2360/23; F16C 17/024; F16C 33/02; F16C 33/04; F05D 2240/54
USPC .......................................... 415/110–112, 229
See application file for complete search history.

(56) References Cited

U.S. PATENT DOCUMENTS

| 5,376,827 | A | * | 12/1994 | Hines | ............ | H02K 7/1823 |
| | | | | | | 310/67 R |
| 5,498,083 | A | | 3/1996 | Brown | | |
| 6,698,930 | B2 | | 3/2004 | Akizuki et al. | | |
| 6,881,027 | B2 | | 4/2005 | Klaass et al. | | |
| 7,251,942 | B2 | | 8/2007 | Dittmar et al. | | |

(Continued)

FOREIGN PATENT DOCUMENTS

| CN | 109415951 A | 3/2019 |
| CN | 110043561 A | 7/2019 |
| JP | 2003120213 A | 4/2003 |

Primary Examiner — Hoang M Nguyen
(74) Attorney, Agent, or Firm — MccGarry Bair PC

(57) ABSTRACT

An air turbine starter that includes a turbine member for rotatably extracting mechanical power from a flow of fluid, where the turbine member is coupled to a drive shaft to provide a rotational output. The air turbine starter further includes a foil-air bearing assembly and a thrust bearing that rotatably support the drive shaft.

20 Claims, 7 Drawing Sheets

(56) References Cited

U.S. PATENT DOCUMENTS

| | | |
|---|---|---|
| 8,147,143 B2 | 4/2012 | Struziak et al. |
| 8,544,268 B2 | 10/2013 | Begin |
| 9,109,622 B2 | 8/2015 | Meacham et al. |
| 9,238,973 B2 | 1/2016 | Klusman |
| 9,284,918 B2 * | 3/2016 | Ono .................... H02K 5/1672 |
| 9,995,175 B2 | 6/2018 | Becker et al. |
| 11,125,109 B2 * | 9/2021 | Nayak .................... F16C 21/00 |
| 2001/0028845 A1 | 10/2001 | Langston et al. |
| 2004/0234369 A1 | 11/2004 | Feest |
| 2005/0193732 A1 | 9/2005 | LaRue |
| 2010/0218499 A1 * | 9/2010 | Shibui .................. F01D 25/168 |
| | | 60/607 |
| 2015/0354386 A1 | 12/2015 | Chuong et al. |
| 2017/0370294 A1 | 12/2017 | Gentile et al. |
| 2019/0195129 A1 | 6/2019 | Morris |

\* cited by examiner

FOIL-AIR BEARING ASSEMBLY FOR ENGINE STARTER

CROSS REFERENCE TO RELATED APPLICATIONS

This application is a continuation of U.S. patent application Ser. No. 16/778,278, filed Jan. 31, 2020, issued on Jan. 31, 2020 as U.S. Pat. No. 11,125,109, the contents of which is incorporated herein by reference in its entirety.

TECHNICAL FIELD

The disclosure generally relates to a foil-air bearing assembly for an engine starter, specifically a foil-air bearing assembly for an air turbine starter.

BACKGROUND

A turbine engine, for example a gas turbine engine, is engaged in regular operation to an air turbine starter. Air turbine starters are typically mounted to the engine through a gearbox or other transmission assembly. The transmission transfers power from the starter to the engine to assist in starting the engine. The internal components of both the turbine engine and the air turbine starter spin together such that the air turbine starter can be used to start the engine.

DETAILED DESCRIPTION

Figure 1:
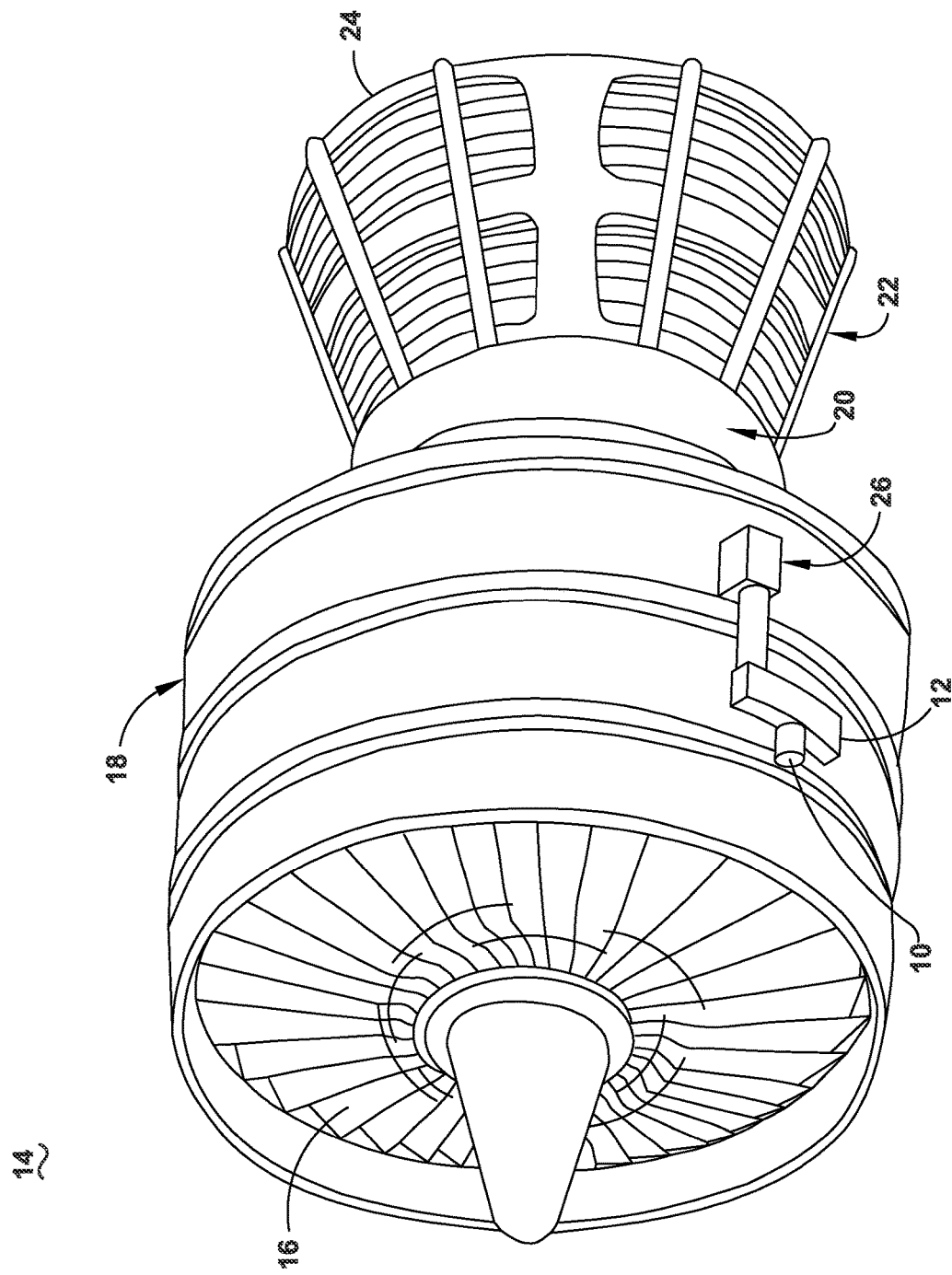
FIG. 1 is a schematic illustration of a turbine engine with a starter, in accordance with various aspects described herein.

Aspects of the disclosure described herein are directed to a turbine engine with a starter that includes a shaft bearing and a foil-air bearing assembly to rotatably support a drive shaft. For purposes of illustration, the present disclosure will be described with respect to a starter for an aircraft turbine engine. For example, the disclosure can have applicability in other vehicles or engines, and can be used to provide benefits in industrial, commercial, and residential applications as further described in FIG. 7.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Referring to FIG. 1, a starter motor or air turbine starter 10 is coupled to an accessory gear box (AGB) 12, also known as a transmission housing, and together are schematically illustrated as being mounted to a turbine engine 14 such as a gas turbine engine. This assembly is commonly referred to as an Integrated Starter/Generator Gearbox (ISGB). The turbine engine 14 comprises an air intake with a fan 16 that supplies air to a high-pressure compression region 18. The air intake with a fan 16 and the high-pressure compression region collectively are known as the 'cold section' of the turbine engine 14 upstream of the combustion. The high-pressure compression region 18 provides a combustion chamber 20 with high pressure air. In the combustion chamber, the high-pressure air is mixed with fuel and combusted. The hot and pressurized combusted gas passes through a high-pressure turbine region 22 and a low-pressure turbine region 24 before exhausting from the turbine engine 14. As the pressurized gases pass through the high-pressure turbine (not shown) of the high-pressure turbine region 22 and the low-pressure turbine (not shown) of the low pressure turbine region 24, the turbines extract rotational energy from the flow of the gases passing through the turbine engine 14. The high-pressure turbine of the high-pressure turbine region 22 can be coupled to the compression mechanism (not shown) of the high-pressure compression region 18 by way of a shaft to power the compression mechanism. The low-pressure turbine can be coupled to the fan 16 of the air intake by way of a shaft to power the fan 16.

The AGB 12 is coupled to the turbine engine 14 at either the high pressure or low pressure turbine region 22, 24 by way of a mechanical power take-off 26. The mechanical power take-off 26 contains multiple gears and means for mechanical coupling of the AGB 12 to the turbine engine 14. Under normal operating conditions, the mechanical power take-off 26 translates power from the turbine engine 14 to the AGB 12 to power accessories of the aircraft for example but not limited to fuel pumps, electrical systems, and cabin environment controls. The air turbine starter 10 can be mounted on the outside of either the air intake region containing the fan 16 or on the core near the high pressure compression region 18.

Figure 2:
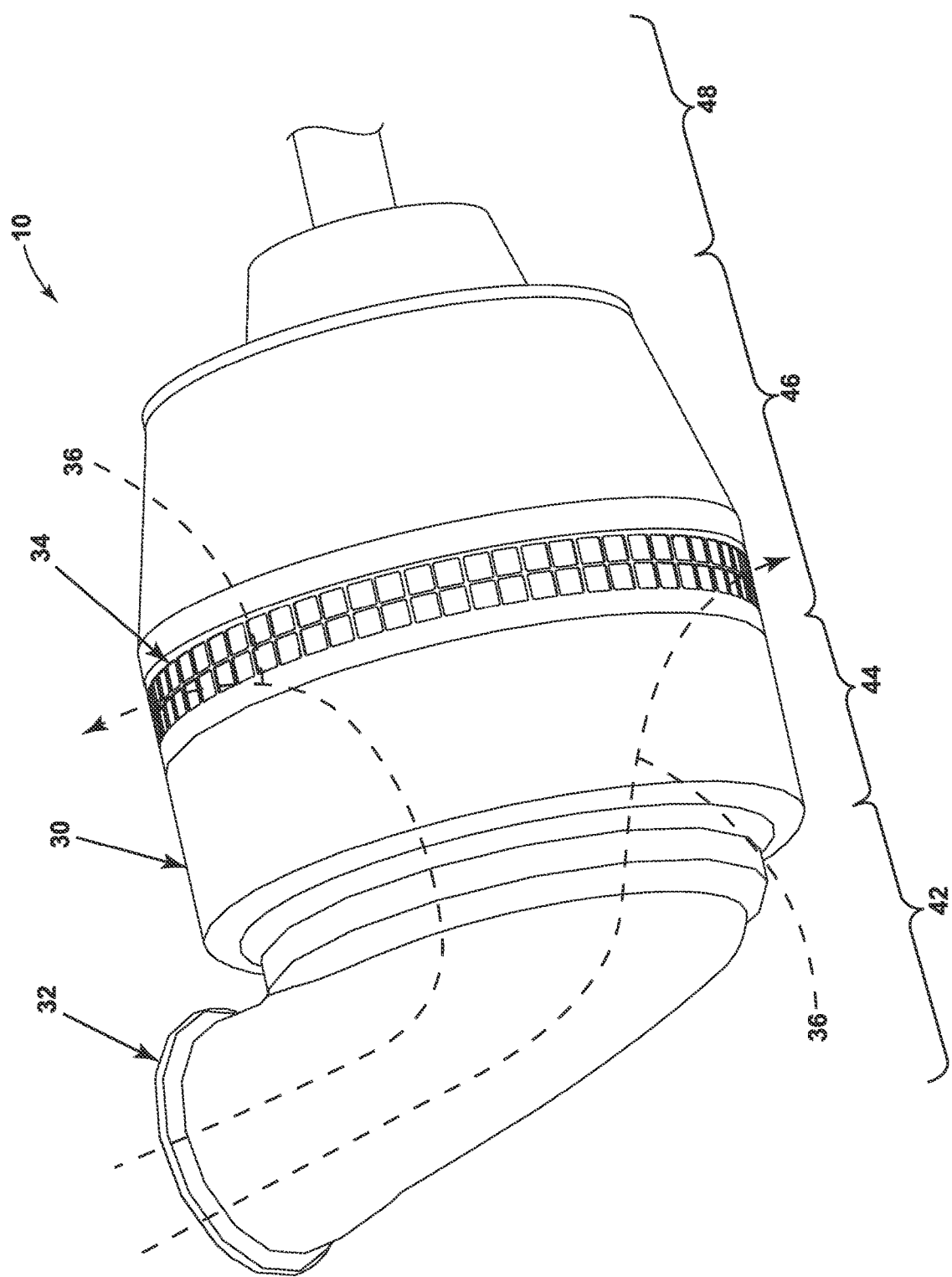
FIG. 2 is a perspective view of the starter of FIG. 1, in accordance with various aspects described herein.

Referring now to FIG. 2, a perspective view of exemplary air turbine starter 10 is shown in greater detail. Generally, the air turbine starter 10 includes a housing 30 defining an inlet 32 and an outlet 34. A primary air flow path 36, illustrated schematically with arrows, extends between the inlet 32 and the outlet 34 for communicating a flow of fluid, including, but not limited to gas, compressed air, or the like, there through. In one non-limiting example, the fluid is air, such as pressurized air, that is supplied from a pressurized air source, including but not limited to, a ground-operating air cart, an auxiliary power unit, or a cross-bleed start from an engine already operating.

The housing 30 can be formed in any suitable manner including, but not limited to, that it can be made up of two or more parts that are joined or otherwise coupled together or can be integrally formed as a single piece.

In the depicted aspects of the disclosure, the housing 30 of the air turbine starter 10 generally defines, in an in-line series arrangement, an inlet assembly 42, a turbine section 44, a gear box 46, and a drive section 48. The air turbine starter 10 can be manufactured with any suitable materials and methods, including, but not limited to, additive manufacturing or die-casting of high strength and lightweight metals such as aluminum, stainless steel, iron, or titanium. The housing 30 and the gear box 46 can be formed with a thickness sufficient to provide adequate mechanical rigidity without adding unnecessary weight to the air turbine starter 10 and, therefore, the aircraft.

Figure 3:
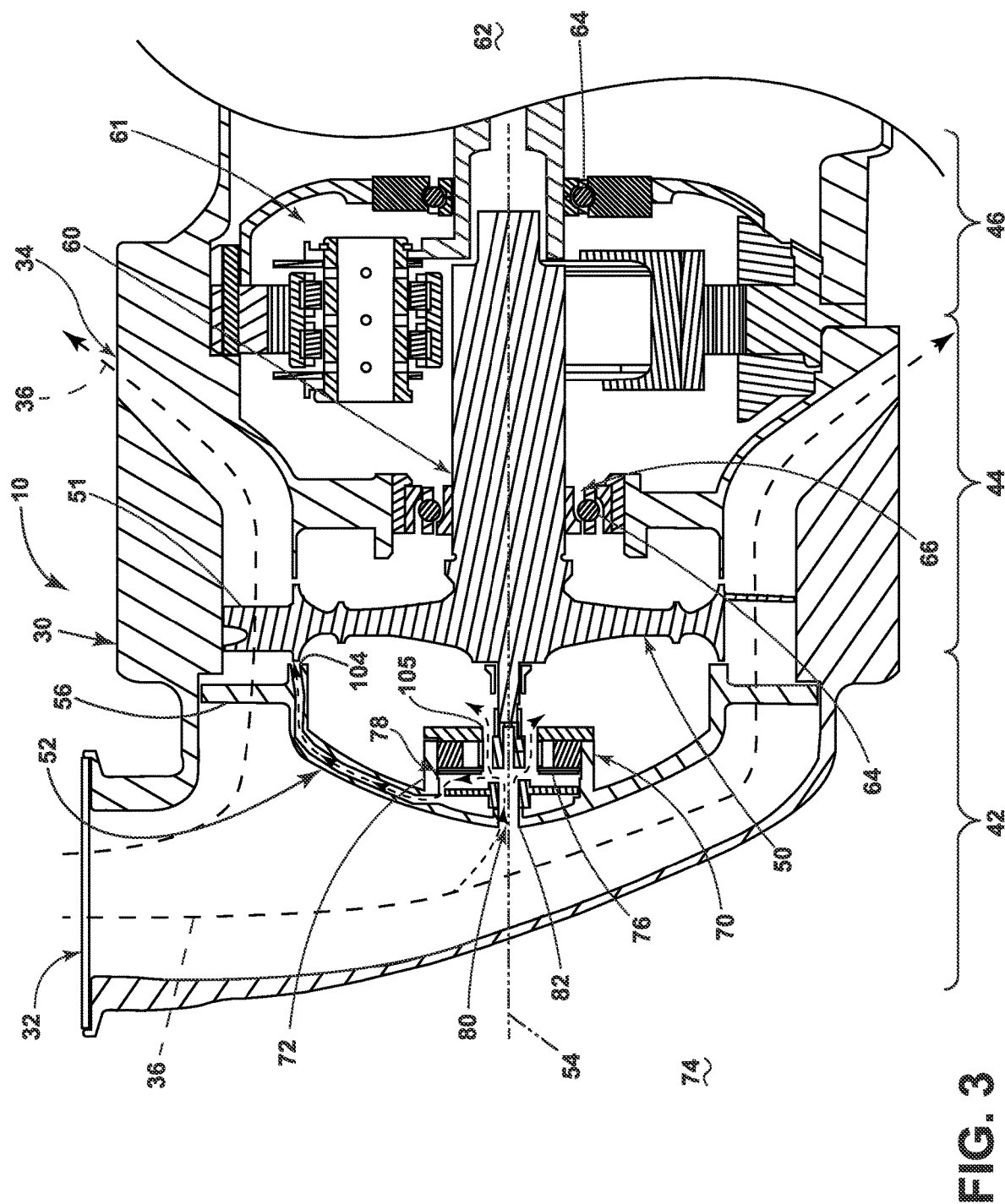
FIG. 3 is a schematic cross-sectional view of a portion of the starter of FIG. 2, in accordance with various aspects described herein.

FIG. 3 is a schematic cross section of the air turbine starter 10 of FIG. 2 which shows the inlet assembly 42, the turbine section 44, and the gear box 46 in greater detail. The turbine section 44 can include a turbine member 50 with a rotor portion 51 journaled within the housing 30. The turbine member 50, and the rotor portion 51 thereof, can rotate about an axis of rotation 54. The turbine member 50 can be disposed in the flow path 36 for rotatably extracting mechanical power from the flow of gas from the inlet 32 to the outlet 34.

An output shaft or drive shaft 60 operably couples to the turbine member 50 and is rotationally driven thereby. The drive shaft 60 allows for the transfer of energy from air in the flow path 36 to rotational mechanical power. The drive shaft 60 can extend through at least a portion of the inlet assembly 42, the turbine section 44, and the gear box 46. By way of non-limiting example, the drive shaft 60 can be configured to provide a rotational output from the turbine member 50 or rotor portion 51 to one or more gears or clutch assemblies such as a gear train 61 in the gear box 46.

At least one thrust bearing 64 can be configured to rotatably support the turbine member 50 and the drive shaft 60. The at least one thrust bearing 64 can include any number of bearings, including a single thrust bearing or multiple thrust bearings. The at least one thrust bearing 64 can couple to the drive shaft 60 at a rear side 62 of the turbine member 50 or the rotor portion 51. The at least one thrust bearing 64 can be located in a wet portion 66 of the housing 30. That is, the at least one thrust bearing 64 can be lubricated with a grease or oil in the wet portion of the housing 30. The wet portion 66 is a cavity or portion in the housing 30 that is exposed to liquid coolant, whereas a dry portion can be a cavity or portion that is not exposed to liquid coolant. By way of non-limiting example, the forward side of the turbine member 50 is a dry portion of the housing 30. It will be understood that while some lubricant may be included or located within the dry portion such lubricant is not enough to fully lubricate the forward portion of the drive shaft 60.

The inlet assembly 42 can include a stator 52 to guide the air flow in the flow path 36. By way of non-limiting example, the stator 52 can define at least a portion of the flow path 36 from the inlet 32 to the rotor portion 51. The stator 52 can include a permeable portion 56, where air in the flow path 36 can pass through the stator 52. The permeable portion 56 can be at least one airfoil, nozzle, vent, or any other structure used to direct or allow the flow of air.

At least one nozzle 80 can be at least in part defined by the stator 52. While illustrated at an apex 82 of the stator 52 upstream of the turbine member 50 or rotor portion 51, it is contemplated that the at least one nozzle 80 can be defined by any portion of the stator 52. It is further contemplated that the at least one nozzle 80 can be defined by any portion or attachment to the housing 30. The nozzle 80 can allow a portion of the air from the flow path 36 to flow through the stator 52, exiting the stator 52 at an outlet 104 upstream of the turbine member 50. Additionally, or alternatively, the portion of the air from the flow path 36 that flows through the stator 52 can exit the stator 52 at an axial outlet 104 upstream of the turbine member 50.

A foil-air bearing assembly 70 can also be included in the air turbine starter 10. The foil-air bearing assembly 70 is configured to rotatably support the drive shaft 60 at a forward side 74 of the turbine member 50 or rotor portion 51. A foil-air housing 72 of the foil-air bearing assembly 70 can be at least partially defined by the stator 52. A radial foil bearing 76 and a thrust foil bearing 78 can be included in the foil-air bearing assembly 70. The radial foil bearing 76 and the thrust foil bearing 78 can be located within the bearing housing 72. As illustrated, by way of non-limiting example, the thrust foil bearing 78 is upstream of the radial foil bearing 76.

Figure 4:
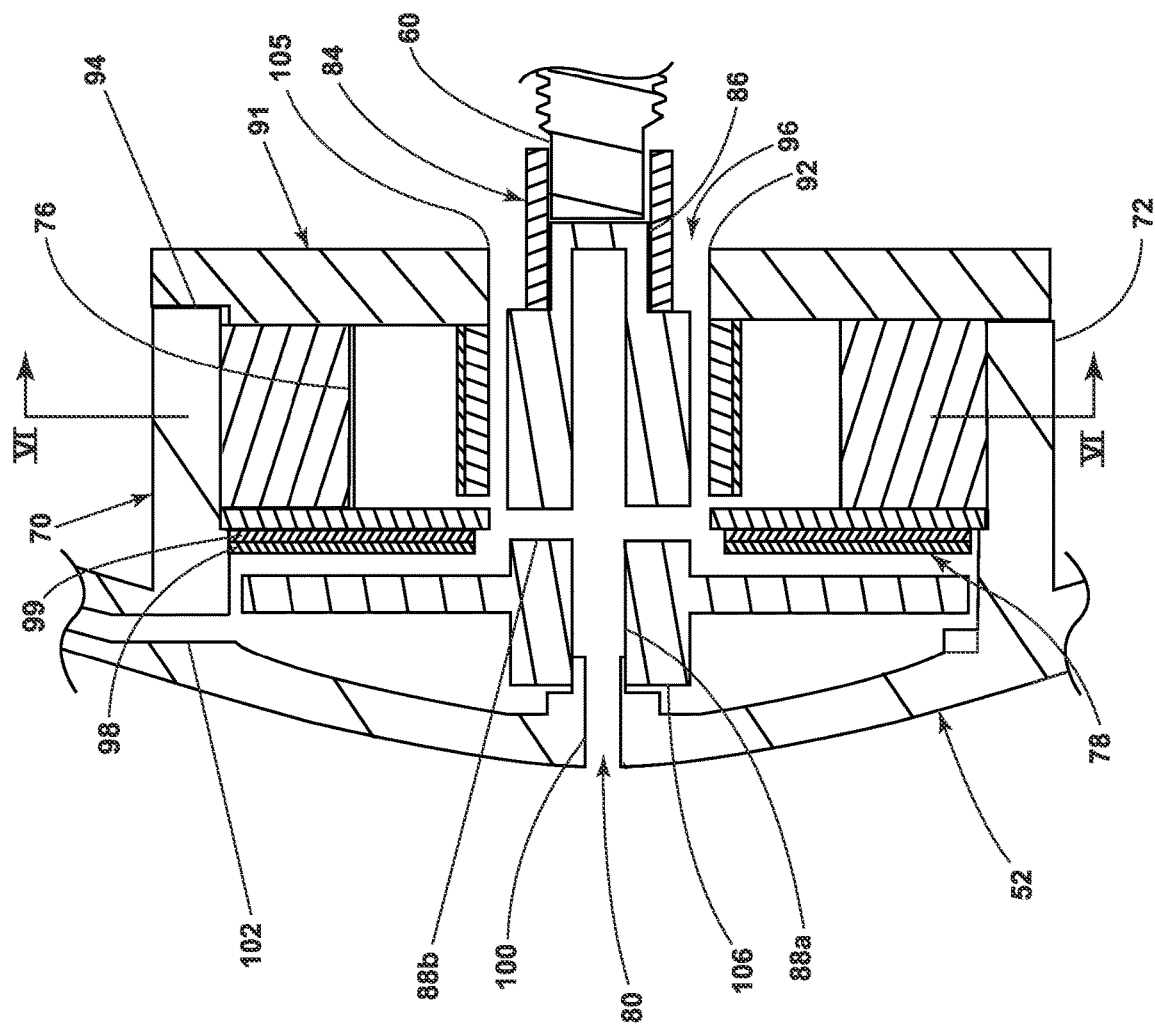
FIG. 4 is an enlarged schematic cross-sectional view of a portion of the starter of FIG. 3, in accordance with various aspects described herein.

Turning to FIG. 4 it can be better seen that the at least one nozzle 80 or stator 52 can define or couple to an air inlet 100. The air inlet 100 fluidly couples to an air exhaust 102. The air exhaust 102 can be defined by a portion of the stator 52 or bearing housing 72. Alternatively, the air exhaust 102 can be defined by an object attached to the stator 52 or housing 30. It is contemplated that the air exhaust 102 is radially exterior of the air inlet 100 or the foil-air bearing assembly 70. The foil-air bearing assembly 70 can be located fluidly between the air inlet 100 and the air exhaust 102. While illustrated as exhausting upstream of the turbine member 50 into the flow path 36 (see FIG. 3) at the output 104, it is contemplated that the air exhaust 102, can exhaust to any portion of the flow path 36 or exterior of the housing 30 at any location.

At an opposite end of the bearing housing 72 from the air inlet 100, a plate 91 having an aperture 92 is mounted to an open end 94 of the bearing housing 72. The plate 91 along with portions of the bearing housing 72 define an enclosed interior 96. Optionally, a gap or the aperture 92 between the plate 91 and a shaft extension 84 can define the axial outlet 105. Additionally, or alternatively, the plate 91 or a body 86 of the shaft extension 84 can include perforations that define the axial outlet 105.

The shaft extension 84 having the body 86 can be operably coupled to the forwardmost end of the drive shaft 60 and located within the interior 96. The body 86 of the shaft extension 84, by way of non-limiting example, is illustrated as having a first internal air flow channel 88a and a second internal air flow channel 88b that fluidly connect the air inlet 100 and the radial foil bearing 76 or the thrust foil bearing 78 located in the bearing housing 72. A flange 106 can be located at the forwardmost end of the shaft extension 84. The flange 106 can be used to locate the foil-air bearing assembly 70 within the bearing housing 72. As illustrated by way of non-limiting example, the flange 106 can be forward of the foil-air thrust bearing 78 and rotatably couple or mount to the stator 52. The thrust foil bearing 78 can include a thrust top foil 98 and a thrust bump foil 99.

At least one of the shaft extension 84 or the drive shaft 60 can pass through the aperture 92 such that the foil-air bearing assembly 70 can be operably coupled to. By way of illustration, the shaft extension 84 passes through the aperture 92 so that the shaft extension 84 is journaled within the foil-air bearing assembly 70.

In operation, pressurized air is supplied to the inlet 32 of the starter 10. The pressurized air can flow through the air turbine starter 10 via the flow path 36 and permeable portion 56. The turbine member 50 in the flow path 36 transfers energy from the air in the flow path 36 to mechanical energy via the drive shaft 60. The drive shaft 60 can include the shaft extension 84, where at least a portion of the shaft extension 84 is journaled in the bearing housing 72.

Upstream or forward of the turbine member 50, a portion of the pressurized air flow in the flow path 36 can be diverted or routed or otherwise separated from the flow path 36. The diverted or routed air from the flow path 36 passes through the stator 52 via the nozzle 80 to form a bearing air flow 90 that can be pressurized. The bearing air flow 90 flows through the air inlet 100 into the first internal air flow channel 88a. The first internal air flow channel 88a can be formed in the flange 106 or other portion of the shaft extension 84 to allow for the axial flow of the bearing air flow 90. The second internal air flow channel 88b can be fluidly connected to the first internal air flow channel 88a. The second internal air flow channel 88b can allow for the radial flow of the bearing air flow 90 to the foil-air bearing assembly 70.

Once the bearing air flow 90 reaches the foil-air bearing assembly 70, the bearing air flow 90 can split, where a portion of the bearing air flow 90 can be supplied to the radial foil bearing 76 and another portion can be provided to the thrust foil bearing 78. The bearing air flow 90 in the radial foil bearing 76 provides an air film or cushion that radial supports and the shaft extension 84. Once an initial predetermined speed of rotation is passed by the shaft extension 84 and the air film is formed, the radial foil bearing 76 allows the shaft extension 84 to rotate in a nearly frictionless environment. The radial foil bearing 76 shares rotatably support of the drive shaft 60 with the at least one thrust bearing 64. The radial foil bearing 76 can provide support to the drive shaft 60 or shaft extension 84 upstream of the turbine member 50, while the at least one thrust bearing 64 can provide support for the drive shaft 60 downstream or to the rear of the turbine member 50. The shared support and addition of the foil-air bearing assembly 70 with the at least one thrust bearing 64 can result in a lower load and cooler temperatures for the at least one thrust bearing 64.

The bearing air flow 90 in the thrust foil bearing 78 helps to axially locate and secure the shaft extension 84. The bearing air flow 90 from the foil-air bearing assembly 70 can be exhausted through the air exhaust 102. The air exhaust 102 or the axial outlet 105 can discharge the bearing air flow 90 back into the flow path 36 prior to the turbine member 50.

Figure 5:
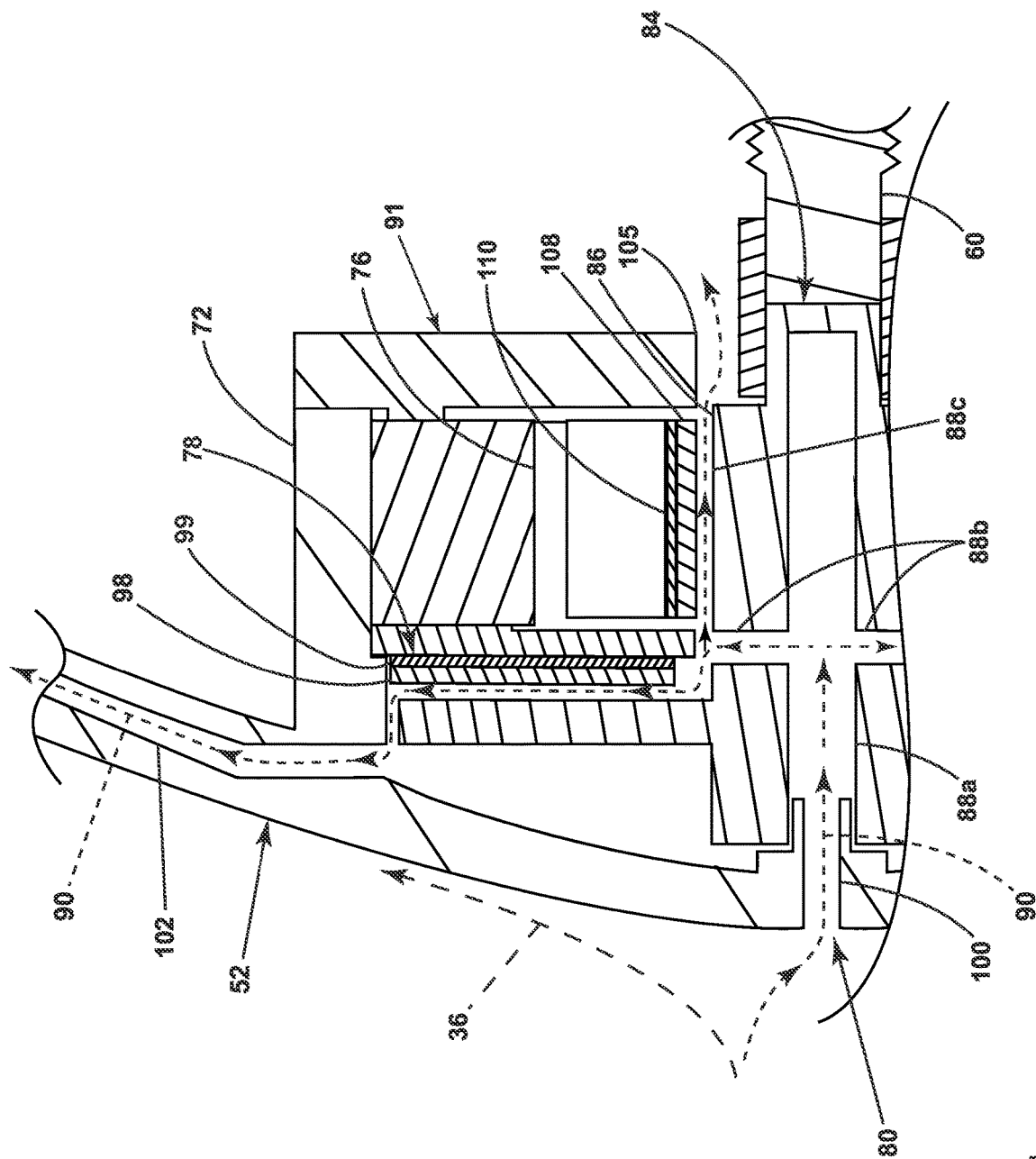
FIG. 5 an enlarged schematic cross-sectional view to illustrate air flow through a portion of the starter of FIG. 4, in accordance with various aspects described herein.

FIG. 5 schematically illustrates a portion of the air from the flow path 36 that form a bearing air flow 90 that flows through at least a portion of the bearing housing 72. The bearing air flow 90 is illustrated with arrows. The bearing air flow 90 can be air diverted, routed or otherwise from the flow path 36. The bearing air flow 90 enters the nozzle 80 and passes through the air inlet 100. The bearing air flow 90 continues through the body 86 of the shaft extension 84 via the first internal air flow channel 88a. The first internal air flow channel 88a fluidly couples to the second internal air flow channel 88b such that the bearing air flow 90 can enter the foil-air bearing assembly 70. The bearing air flow 90 can then enter the radial foil bearing 76 and the thrust foil bearing 78. Optionally, in addition or as an alternative, the second internal air flow channel 88b can fluidly couple to the axial outlet 105 via a third internal air flow channel 88c.

The portion of the bearing air flow 90 that enters the thrust foil bearing 78 can provide additional support to the position of the drive shaft 60 and shaft extension 84 in the axial direction. As the body 86 rotates, the thrust top foil 98 provides a smooth surface for the bearing air flow 90 to develop a gas film. The gas film provides hydrodynamic pressure that works to maintain the location of the shaft extension 84. It is also contemplated that the thrust bump foil 99 can further maintain the axial location of the shaft extension 84. The bearing air flow 90 can then be exhausted from the thrust foil bearing 78 or foil-air bearing assembly 70 through the air exhaust 102.

The portion of the bearing air flow 90 that flows into the radial foil bearing 76 is drawn into the radial foil bearing 76 between the shaft extension 84 and a top foil 108. When the drive shaft 60 and the shaft extension 84 spin at a high enough speed, bump foil or flexible portions 110 can flex due to air pressure or centripetal force, creating a gap between the drive shaft 60 or shaft extension 84 and the top foil 108. The bearing air flow 90 can create a film of air between the shaft extension 84 and the top foil 108 of the radial foil bearing 76. The bearing air flow 90 from the radial foil bearing 76 can be exhausted through the axial outlet 105 or the thrust foil bearing 78. It is contemplated that any number of internal air flow channels can be used to direct the bearing air flow 90 from the air inlet 100 to the air exhaust 102 or axial outlet 105 via the bearing housing 72 or foil-air bearing assembly 70. It is further contemplated that any number of air inputs or air exhausts can be used to let in or exhaust the bearing air flow 90 from at least one internal air flow channel 88a, 88b, the bearing housing 72 or foil-air bearing assembly 70.

Figure 6:
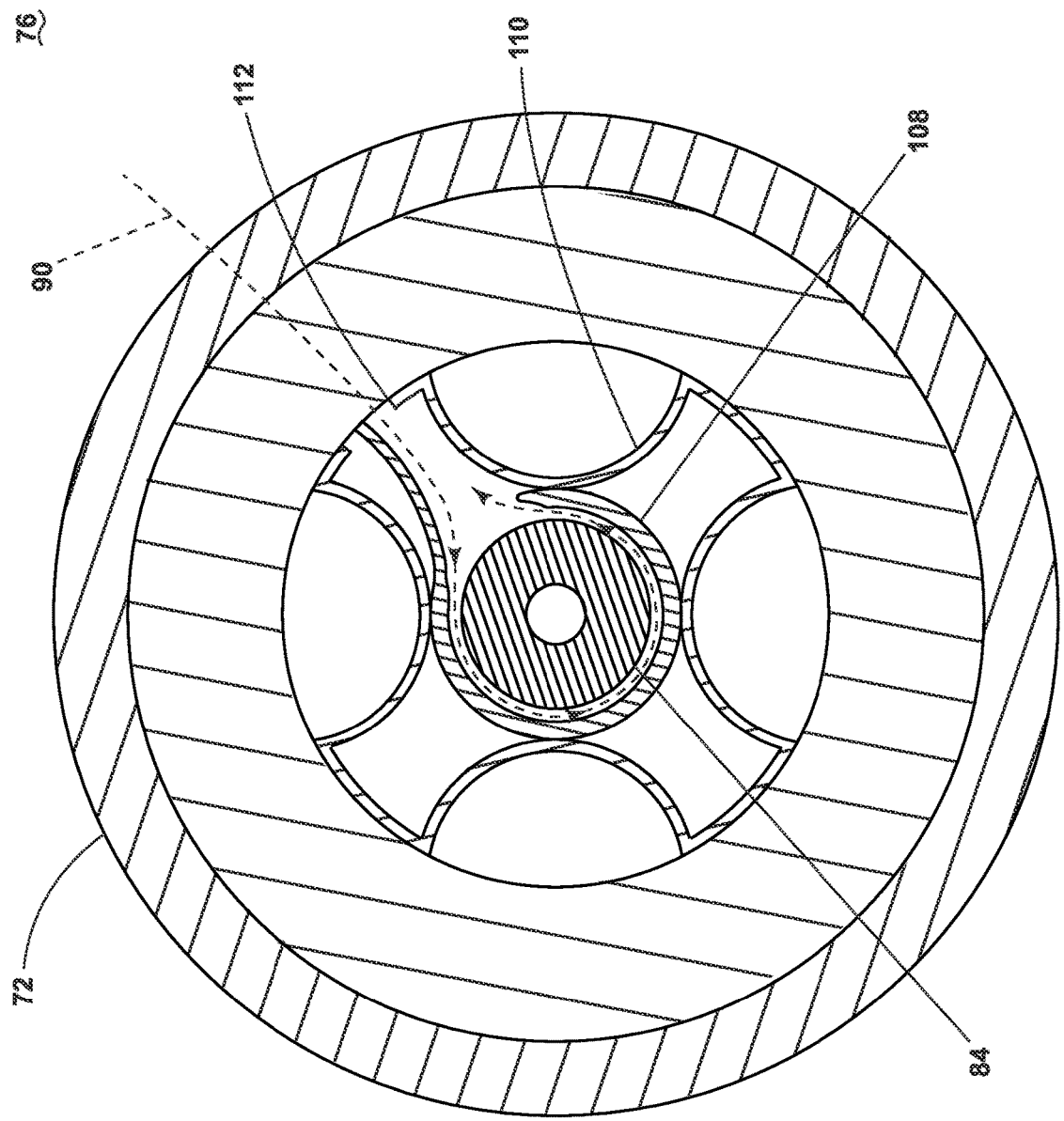
FIG. 6 is a schematic cross-sectional view illustrating an air flow through a portion of the starter of FIG. 4 taken along the section line VI-VI, in accordance with various aspects described herein.

FIG. 6 is a cross section take along line VI-VI in FIG. 4 to further schematically illustrate the bearing air flow 90 through the radial foil bearing 76. The bearing air flow 90 is illustrated as flowing through a bearing opening 112 in the flexible portions 110. When the drive shaft 60 or shaft extension 84 spins at a predetermined rate, the flexible portions 110 bend and allow the bearing air flow 90 to flow between the drive shaft 60 or the shaft extension 84 and the top foil 108.

Many other possible examples and configurations in addition to those shown in the above figures are contemplated by the present disclosure. Additionally, the design and placement of the various components such as the AGB 12 or the air turbine starter 10 or components thereof can be rearranged such that a number of different in-line configurations could be realized.

Benefits associated with aspects of the disclosure herein include a reduced load on at least one of the thrust bearings through the inclusion of the foil-air bearing. The reduction in load on the thrust bearing can reduce the temperature of the thrust bearing during operation.

Reduced temperatures in the thrust bearing can lead to longer part life. Additionally, the reduced running temperature in the thrust bearing can lead to an overall longer operational time for the starter.

The reduced temperatures in the thrust bearing can also allow for a faster rotation of the drive shaft. A faster rotation of the drive shaft increases the power output from the starter. This will allow smaller starters to provide the power needed to start a larger variety of turbine engines.

This design can be used on existing air turbine starters that are already serving turbine engines. The foil-air bearings housed in the stator can replace existing stators and couple to currently cantilevered drive shafts to provide increased stability to the drive shaft. Foil-air bearings allow for a nearly frictionless rotation of the extension shaft inside the bearing once the air film or air clearance is obtained. These types of bearings require little to no lubrication, which is particularly beneficial in areas where lubricant cannot be supplied or adequately maintained. Inclusion of the foil-air bearing allows the assembly to have a longer life and rotate at faster speeds.

Figure 7:
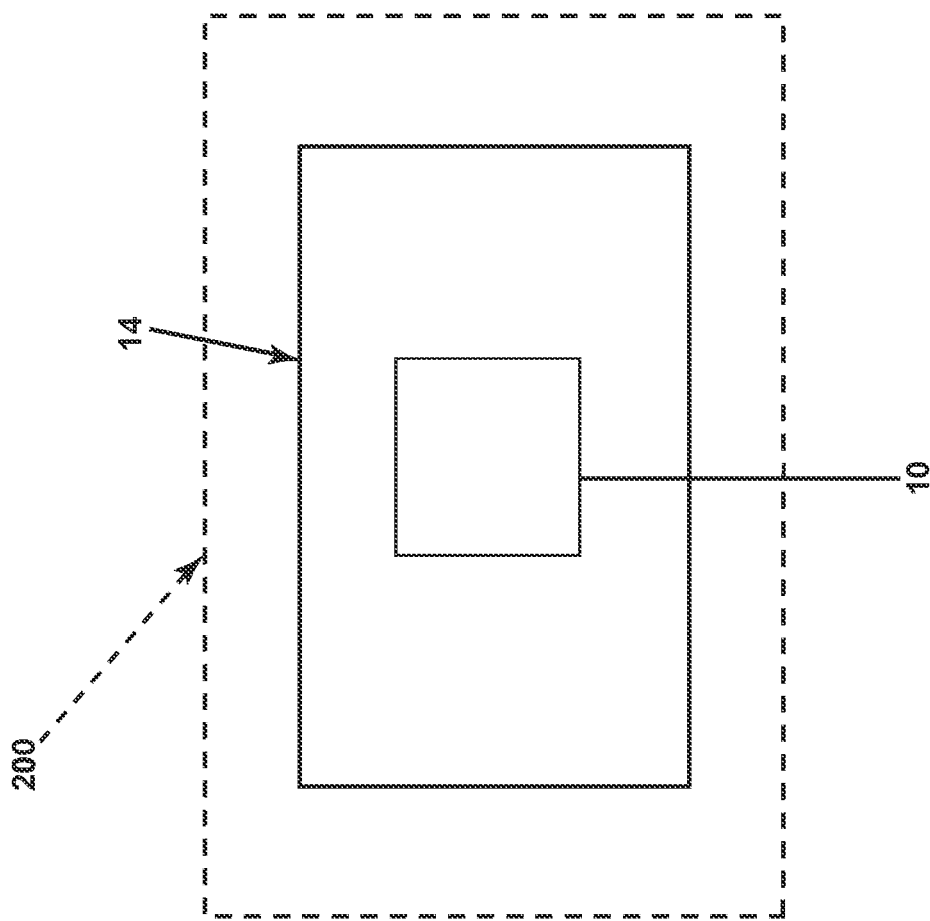
FIG. 7 is a schematic illustration of the turbine engine and starter from FIG. 1 in a vehicle or structure.

FIG. 7 is a schematic illustration of the turbine engine 14 and starter 10 from FIG. 1, where the turbine engine 14 can be in a vehicle or structure 200. The vehicle or structure 200 can be, by way of non-limiting example, a helicopter or other aircraft, a boat or other aquatic vehicle, or a car or other land vehicle. Further, the vehicle or structure 200 can be, but is not limited to, a marine power plant, a wind turbine, or a small power plant. It is further considered that the turbine engine 14 can be any engine using a turbine with the starter/generator 10 required by the vehicle or structure 200.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

1. An air turbine starter that includes a housing defining an inlet, an outlet, and a flow path extending between the inlet and the outlet for communicating a flow of gas there through, a turbine member having a rotor portion journaled within the housing and disposed within the flow path for rotatably extracting mechanical power from the flow of gas, a drive shaft operably coupled with the turbine member and configured to provide a rotational output, a foil-air bearing assembly configured to rotatably support the drive shaft at a forward side of the turbine member, a thrust bearing configured to rotatably support at least one of the drive shaft or the turbine member, rear of the rotor portion, and a stator upstream of the turbine member, the stator having at least one nozzle and at least partially defining a bearing housing for the foil-air bearing assembly.

2. The air turbine starter of clause 1 wherein the thrust bearing is lubricated within a wet portion of the housing.

3. The air turbine starter of any preceding clause wherein the foil-air bearing assembly comprises a radial foil bearing and a thrust foil bearing within the bearing housing.

4. The air turbine starter of any preceding clause wherein the thrust foil bearing is upstream of the radial foil bearing.

5. The air turbine starter of any preceding clause wherein the bearing housing includes an air inlet and an air exhaust fluidly coupled to the at least one nozzle and the foil-air bearing assembly is located fluidly between the air inlet and the air exhaust.

6. The air turbine starter of any preceding clause wherein the air exhaust is radially exterior of the air inlet and the foil-air bearing assembly.

7. The air turbine starter of any preceding clause, further comprising a shaft extension having a body operably coupled to the forwardmost end of the drive shaft, the shaft extension journaled within the foil-air bearing assembly.

8. The air turbine starter of any preceding clause wherein the shaft extension comprises at least one internal air flow channel and is fluidly located between the air inlet and the foil-air bearing assembly.

9. An air turbine starter that includes a housing defining an inlet, an outlet, and a flow path extending between the inlet and the outlet for communicating a flow of gas there through, a turbine member journaled within the housing and disposed within the flow path for rotatably extracting mechanical power from the flow of gas, a drive shaft operably coupled with the turbine member and configured to provide a rotational output, and a foil-air bearing assembly configured to rotatably support the drive shaft at a forward side of the turbine member.

10. The air turbine starter of any preceding clause, further comprising a stator upstream of the turbine member, the stator having at least one nozzle and at least partially defining a bearing housing for the foil-air bearing assembly.

11. The air turbine starter of any preceding clause, wherein the foil-air bearing assembly comprises a radial foil bearing and a thrust foil bearing within the bearing housing.

12. The air turbine starter of any preceding clause wherein the thrust foil bearing is upstream of the radial foil bearing.

13. The air turbine starter of any preceding clause wherein the bearing housing includes an air inlet and an air exhaust fluidly coupled to the at least one nozzle and the foil-air bearing assembly is located fluidly between the air inlet and the air exhaust.

14. The air turbine starter of any preceding clause wherein the air exhaust is radially exterior of the air inlet and the foil-air bearing assembly.

15. The air turbine starter of any preceding clause, further comprising a shaft extension operably coupled to the forwardmost end of the drive shaft, the shaft extension journaled within the foil-air bearing assembly.

16. The air turbine starter of any preceding clause wherein the shaft extension comprises at least one internal air flow channel and is fluidly located between an air inlet and the foil-air bearing assembly.

17. The air turbine starter of any preceding clause wherein the shaft extension further comprises a flange at a forward end thereof, the flange locating the foil-air bearing assembly within the bearing housing.

18. The air turbine starter of any preceding clause, further comprising a plate having an aperture therein mounted to an open end of the bearing housing and wherein one of the shaft extension or the drive shaft pass through the aperture.

19. The air turbine starter of any preceding clause, further comprising a single thrust bearing configured to rotatably support at least one of the drive shaft or the turbine member, rear of a rotor portion.

20. The air turbine starter of any preceding clause wherein the single thrust bearing is lubricated within a wet portion of the housing.

What is claimed is:

1. An assembly comprising:
   a housing;
   a turbine member within the housing;
   a shaft operably coupled with the turbine member;
   a foil-air bearing assembly configured to rotatably support the shaft at a forward side of the turbine member; and
   a stator upstream of the turbine member, the stator having at least one nozzle and at least partially defining a bearing housing for the foil-air bearing assembly.

2. The assembly of claim 1 wherein the foil-air bearing assembly comprises a radial foil bearing and a thrust foil bearing within the bearing housing.

3. The assembly of claim 2 wherein the thrust foil bearing comprises a thrust top foil and a thrust bump foil.

4. The assembly of claim 3 wherein the thrust foil bearing is upstream of the radial foil bearing.

5. The assembly of claim 1, further comprising a flow path at least partially defined by the housing.

6. The assembly of claim 1 wherein the bearing housing includes an air inlet and an air exhaust fluidly coupled to the at least one nozzle and the foil-air bearing assembly is located fluidly between the air inlet and the air exhaust.

7. The assembly of claim 6 wherein the air exhaust is radially exterior of the air inlet and the foil-air bearing assembly.

8. The assembly of claim 6, further comprising a shaft extension having a body operably coupled to a forward end of the shaft, the shaft extension journaled within the foil-air bearing assembly.

9. The assembly of claim 8 wherein the shaft extension comprises at least one internal air flow channel and is fluidly located between the air inlet and the foil-air bearing assembly.

10. The assembly of claim 9 wherein the at least one internal air flow channel is a first internal air flow channel and a second internal air flow channel, wherein the first internal air flow channel extends axially within the body and the second internal air flow channel extends radially within the body.

11. The assembly of claim 8 wherein the shaft extension further comprises a flange at the forward end thereof, the flange locating the foil-air bearing assembly within the bearing housing.

12. The assembly of claim 11 wherein the flange is located forward of a foil-air thrust bearing and rotatably coupled to the stator.

13. The assembly of claim 12, further comprising a plate having an aperture therein mounted to an open end of the bearing housing and wherein one of the shaft extension or the shaft pass through the aperture.

14. The assembly of claim 13 wherein a gap between the plate and the shaft extension defines the air exhaust.

15. The assembly of claim 1, further comprising at least one thrust bearing configured to rotatably support at least one of the shaft or the turbine member, rear of the turbine member.

16. A method for flowing air through a foil-air bearing assembly located in a bearing housing at least partially defined by a stator located upstream of a turbine to rotatably support a shaft or a shaft extension received by the foil-air bearing assembly, the method comprising:
   flowing air through a flow path;
   diverting a portion of the air flowing through the flow path into the stator to define a bearing air flow;
   flowing the bearing air flow through an air inlet and at least one internal air flow channel to the foil-air bearing assembly;
   flowing the bearing air flow through at least one of a radial foil bearing or a thrust foil bearing of the foil-air bearing assembly; and
   exhausting, from the bearing housing in a radial direction, the bearing air flow downstream of the at least one of the radial foil bearing or the thrust foil bearing.

17. The method of claim 16 wherein the flowing of the bearing air flow through the air inlet and the at least one internal air flow channel comprises flowing the bearing air flow axially through a first internal flow channel and radially through a second internal flow channel.

18. The method of claim 16, further comprising providing a gap via a gas film between the shaft or the shaft extension and a top foil of the radial foil bearing.

19. The method of claim 18 wherein the providing the gap via the gas film further comprises flexing a bump foil or flexible portions of the radial foil bearing to create the gap.

20. The method of claim 16, further comprising providing pressurized air to an inlet of the flow path of an air turbine starter.

* * * * *